US012548871B2

(12) United States Patent
Xing et al.

(10) Patent No.: US 12,548,871 B2
(45) Date of Patent: Feb. 10, 2026

(54) PHASE SHIFTER FOR A WIRELESS COMMUNICATION DEVICE COMPRISING A SUBSTRATE HAVING A TRANSMISSION LINE AND A TWO WIRE BIAS LINE, WHERE ONE WIRE HAS GREATER SHEET RESISTANCE THAN THE OTHER WIRE

(71) Applicants: CHENGDU TIANMA MICROELECTRONICS CO., LTD., Chengdu (CN); SHANGHAI TIANMA MICRO-ELECTRONICS CO., LTD., Shanghai (CN)

(72) Inventors: Yifan Xing, Shanghai (CN); Baiquan Lin, Shanghai (CN); Yifan Bao, Shanghai (CN); Xiaonan Han, Shanghai (CN); Taohua Chen, Shanghai (CN); Linzhi Wang, Shanghai (CN); Kerui Xi, Xiamen (CN); Shengwei Dai, Chengdu (CN)

(73) Assignees: CHENGDU TIANMA MICROELECTRONICS CO., LTD., Chengdu (CN); SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 149 days.

(21) Appl. No.: 18/414,422

(22) Filed: Jan. 16, 2024

(65) Prior Publication Data

US 2024/0154284 A1 May 9, 2024

(30) Foreign Application Priority Data

Sep. 28, 2023 (CN) ........................ 202311269897.3

(51) Int. Cl.
*H01P 1/18* (2006.01)
*H01P 1/20* (2006.01)

(52) U.S. Cl.
CPC .............. *H01P 1/181* (2013.01); *H01P 1/184* (2013.01); *H01P 1/2007* (2013.01)

(58) Field of Classification Search
CPC ......... H01P 1/2007; H01P 1/182; H01P 1/184
USPC .................................................. 333/161, 246
See application file for complete search history.

(56) References Cited

U.S. PATENT DOCUMENTS 5,212,463 A * 5/1993 Babbitt et al. .......... H01P 1/181 333/161
2008/0116995 A1* 5/2008 Kim et al. ............ H01P 1/2005 333/161
2014/0253262 A1* 9/2014 Hsieh et al. ........ H01L 23/5223 333/246

* cited by examiner

*Primary Examiner* — Benny T Lee
(74) *Attorney, Agent, or Firm* — KILPATRICK TOWNSEND & STOCKTON LLP

(57) ABSTRACT

A phase shifter and a wireless communication device are provided. The phase shifter includes a first substrate, a radio frequency transmission line arranged on a side of the first substrate, and a bias line connected to the radio frequency transmission line. The bias line includes a first wire and a second wire. A sheet resistance of the second wire is greater than a sheet resistance of the radio frequency transmission line. The first wire and the radio frequency transmission line are connected and form an integrated structure. A line width of the first wire is less than a line width of the radio frequency transmission line. The second wire and the first wire form a lapping region in an extension direction of the first wire. In the lapping region, the second wire is arranged on a side of the first wire away from the first substrate.

20 Claims, 16 Drawing Sheets

PHASE SHIFTER FOR A WIRELESS COMMUNICATION DEVICE COMPRISING A SUBSTRATE HAVING A TRANSMISSION LINE AND A TWO WIRE BIAS LINE, WHERE ONE WIRE HAS GREATER SHEET RESISTANCE THAN THE OTHER WIRE

This application claims priority to Chinese Patent Application No. 202311269897.3, titled "PHASE SHIFTER AND WIRELESS COMMUNICATION DEVICE", filed on Sep. 28, 2023 with the China National Intellectual Property Administration, which is hereby incorporated by reference in its entirety.

FIELD

The present disclosure relates to the field of communication devices, and in particular to a phase shifter and a wireless communication device.

BACKGROUND

With the continuous development of science and technology, more and more electronic devices with wireless communication functions are widely used in daily life and work, greatly facilitating daily life and work, and therefore becoming indispensable and important tools.

Phase shifters, which may adjust a phase of an electromagnetic wave, are widely used in the electronic devices with wireless communication functions and are widely applied to the field of mobile communication, the field of radar, the field of aerospace, and the field of intelligent transportation.

The conventional phase shifters have a problem of a leakage of a radio frequency signal towards a bias line. How to reduce the leakage of the radio frequency signal is a problem required to be solved urgently in design and development of the phase shifters.

SUMMARY OF THE INVENTION

In view of this leakage problem, a phase shifter and a wireless communication device are provided according to the present disclosure. The solutions are described as follows.

In one embodiment, a phase shifter is provided according to the present disclosure. The phase shifter includes: a first substrate, a radio frequency transmission line and a bias line. The radio frequency transmission line is arranged on a side of the first substrate. The bias line is connected to the radio frequency transmission line. The bias line includes a first wire and a second wire. A sheet resistance of the second wire is configured to be greater than a sheet resistance of the radio frequency transmission line. The first wire and the radio frequency transmission line are connected to each other and form an integrated structure. A line width of the first wire is configured to be less than a line width of the radio frequency transmission line. The second wire and the first wire configured to form a lapping region along an extension direction of the first wire. In the lapping region, the second wire is arranged on a side of the first wire away from the first substrate. In a direction perpendicular to a plane where the first substrate is located, the second wire is configured to cover the first wire.

In another embodiment, a wireless communication device is provided according to the present disclosure. The wireless communication device includes a phase shifter. The phase shifter includes: a first substrate, a radio frequency transmission line and a bias line. The radio frequency transmission line is arranged on a side of the first substrate. The bias line is connected to the radio frequency transmission line. The bias line includes a first wire and a second wire. A sheet resistance of the second wire is configured to be greater than a sheet resistance of the radio frequency transmission line. The first wire and the radio frequency transmission line are connected to each other and form an integrated structure. A line width of the first wire is configured to be less than a line width of the radio frequency transmission line. The second wire and the first wire configured to form a lapping region along an extension direction of the first wire. In the lapping region, the second wire is arranged on a side of the first wire away from the first substrate. In a direction perpendicular to a plane where the first substrate is located, the second wire is configured to cover the first wire.

BRIEF DESCRIPTION OF THE DRAWINGS

In order to more clearly describe the embodiments of the present disclosure, drawings to be used in the description of the embodiments of the present disclosure are briefly described hereinafter. It is apparent that the drawings described below are merely used for describing the embodiments of the present disclosure.

The structure, proportion, and size shown in the drawings of the specification are only used for cooperation with the contents disclosed in the specification to facilitate understanding and reading of the embodiments, and are not intended to limit the conditions under which the present disclosure can be implemented, therefor the structure, proportion, and size shown in the drawings have no technically substantive meaning. Any modification of structure, change of proportional relationship, or adjustment of size without affecting the effects and purpose of the present disclosure should fall within the scope of the content disclosed in the present disclosure.

DETAILED DESCRIPTION OF EMBODIMENTS

The embodiments in the present disclosure are described clearly and completely below in conjunction with the drawings in the embodiments of the present disclosure. Apparently, the embodiments described below are only some embodiments of the present disclosure, rather than all the embodiments.

Therefore, the present disclosure is intended to cover modifications and variations of the present disclosure, which fall within the scope of the claims (the claimed embodiments) and their equivalents. It should be noted that the implementations provided in the embodiments of the present disclosure may be combined with each other without contradiction.

In order to make the embodiments of the present disclosure understandable, the present disclosure is further described in detail below in conjunction with the drawings and the embodiments.

Figure 1:
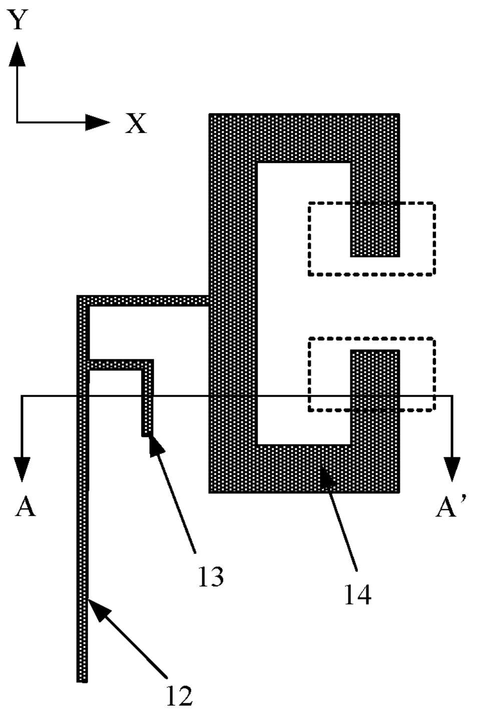
FIG. 1 is a top view of signal lines on a surface of a first substrate in a phase shifter according to an embodiment of the present disclosure.
Figure 2:
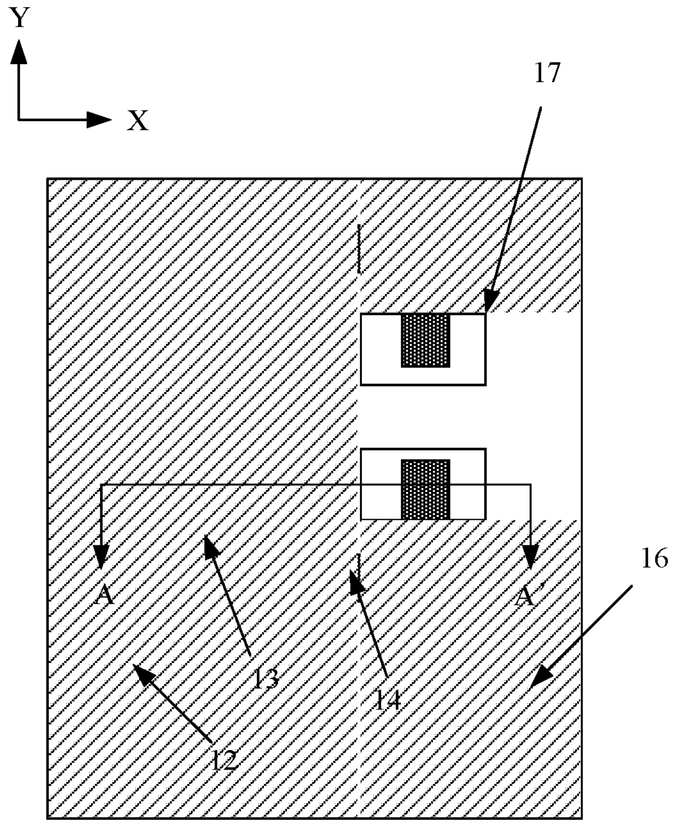
FIG. 2 is a top view showing relative positions of a reference electrode and signal lines on a first substrate in a phase shifter according to an embodiment of the present disclosure.
Figure 3:
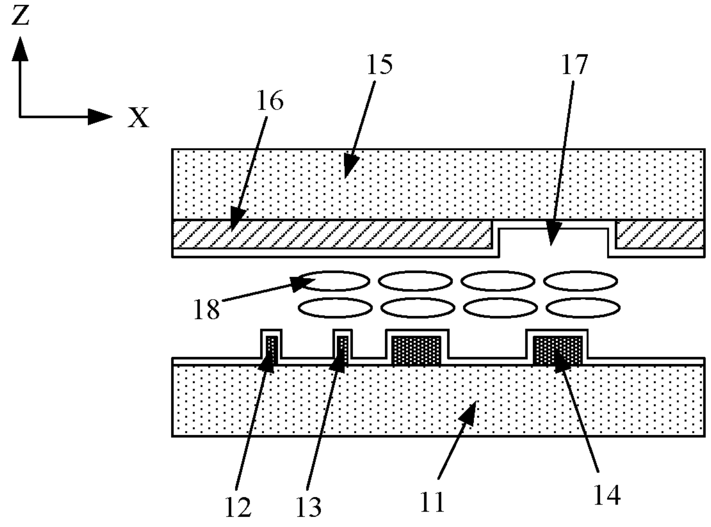
FIG. 3 is a sectional view of the phase shifter shown in FIG. 1 in an A-A' direction.

Referring to FIG. 1 to FIG. 3, FIG. 1 is atop view of signal lines on a surface of a first substrate in a phase shifter according to an embodiment of the present disclosure, FIG. 2 is a top view showing relative positions of a reference electrode and signal lines on a first substrate in a phase shifter according to an embodiment of the present disclosure, and FIG. 3 is a sectional view of the phase shifter shown in FIG. 1 in an A-A' direction. The phase shifter includes a bias line 12, a choke branch 13 and a radio frequency transmission line 14 that are arranged on a side of a first substrate 11, and a reference electrode 16 arranged on a surface of a second substrate 15.

The bias line 12, the choke branch 13, and the radio frequency transmission line 14 are an integrated structure formed by a same conductive layer on the surface of the first substrate 11. The reference electrode 16 is a conductive layer arranged on the surface of the second substrate 12, and the conductive layer has openings 17, and the radio frequency transmission line 14 transmits and receives radio frequency signals through the openings 17. Two openings 17 of the reference electrode 16 shown in FIG. 2 are respectively arranged above the regions indicated by the dashed boxes shown in FIG. 1, and two ends of the radio frequency transmission line 14 are exposed from the conductive layer where the reference electrode 16 is arranged to transmit and receive radio frequency signals. The openings 17 may be in a rectangle-shape or in a circle-shape, and the sizes of the openings 17 are not less than the line width of the radio frequency transmission line 14, facilitating reception and transmission of the radio frequency signals.

A first metal layer and a second metal layer may be made of a material such as Cu, Ag, Au, or a metal alloy. Considering the manufacturing cost and the electrical performance of the phase shifter, the first metal layer and the second metal layer may be made of Cu.

A bias signal is provided for the radio frequency transmission line 14 based on the bias line 12, and an electric field is formed between the radio frequency transmission line 14 and the reference electrode 16, and a dielectric constant of a dielectric layer 18 between the first substrate and the second substrate is changed, to change a phase of the radio frequency signal transmitted through the radio frequency transmission line 14. The radio frequency signal is leaked due to the bias line 12, resulting in a poor bias isolation of the phase shifter.

In order to suppress the radio frequency signal leaked by the bias line 12, the line width of the bias line 12 is configured to be less than the line width of the radio frequency transmission line 14, and the bias line 12 has a larger inductance to suppress the input of the radio frequency signal. In the embodiments of the present disclosure, a line width of a signal line refers to a width of the signal line in a direction perpendicular to an extension direction of the signal line.

In an embodiment of the present disclosure, descriptions are provided by taking the dielectric layer 18 made of a liquid crystal material as an example. Apparently, the dielectric layer 18 may further be made of other dielectric materials which may change a dielectric constant based on an electrical signal. The material of the dielectric layer 18 is not limited in the embodiments of the present disclosure.

The two ends of the radio frequency transmission line 14 serve as radio frequency signal terminals for receiving and transmitting radio frequency signals. A position at which the radio frequency transmission line 14 and the bias line 12 are connected serves as a bias-signal input terminal of the radio frequency transmission line 14. In an ideal situation, it is required for the phase shifter to transmit a radio frequency signal in the radio frequency transmission line 14 and between the two radio frequency signal terminals and to suppress transmitting the radio frequency signal from the bias-signal input terminal to the bias line 12.

In the signal line design shown in FIG. 1 to FIG. 3, the bias line 12 and the radio frequency transmission line 14 are arranged on a same layer, and the bias line 12 is electrically connected to the radio frequency transmission line 14. The choke branch 13 is arranged, improving the choke effect and reducing leakage. Based on the signal line design, an overall bias isolation of −20 dB can be achieved.

To reduce the bias isolation, increase the choke effect, enhance the bias line 12 suppressing the radio frequency signal and reduce the leakage of the radio frequency signal to the bias line 12, the bias line 12 may be made of a conductive material with high impedance.

Transparent oxide conductive materials are widely used as signal line materials in electronic devices, and have high impedance compared to metal materials. Therefore, the bias line 12 may be made of an oxide conductive material, and an inductance of the bias line 12 is greatly increased, increasing a difference between the inductance of the bias line 12 and the inductance of the radio frequency transmission line 14, and to reduce the bias isolation and enhancing the effect of the bias line 12 suppressing the radio frequency signal. The oxide conductive material may be ITO (indium tin oxide), IZO (indium zinc oxide), or the like.

Figure 4:
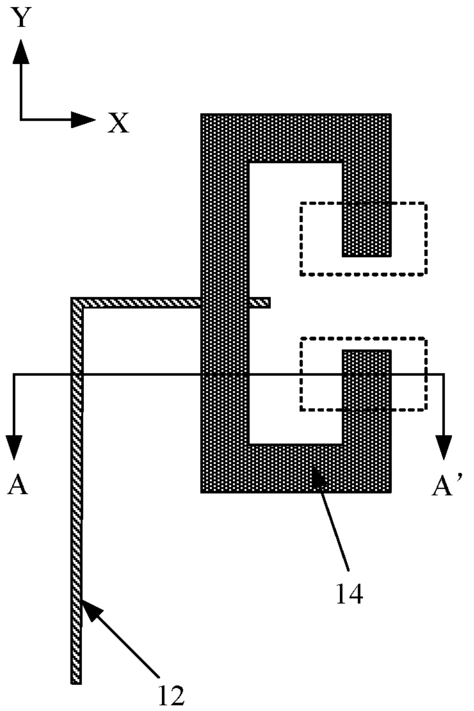
FIG. 4 is a top view of signal lines on a surface of a first substrate in a phase shifter according to another embodiment of the present disclosure.
Figure 5:
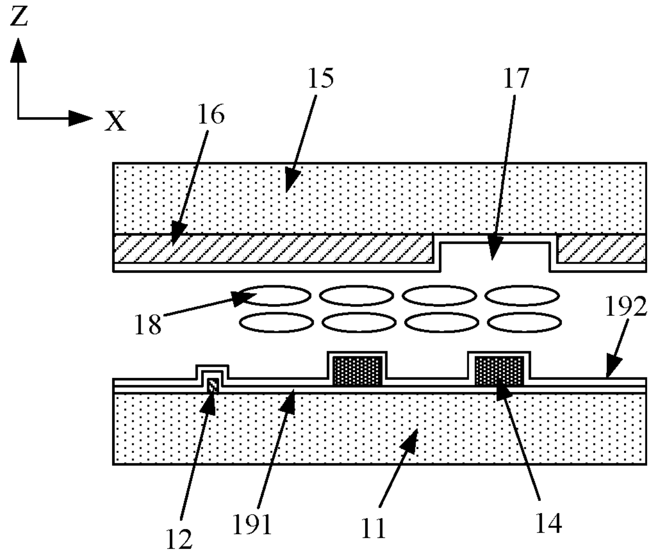
FIG. 5 is a sectional view of the phase shifter shown in FIG. 4 in an A-A' direction.
Figure 6:
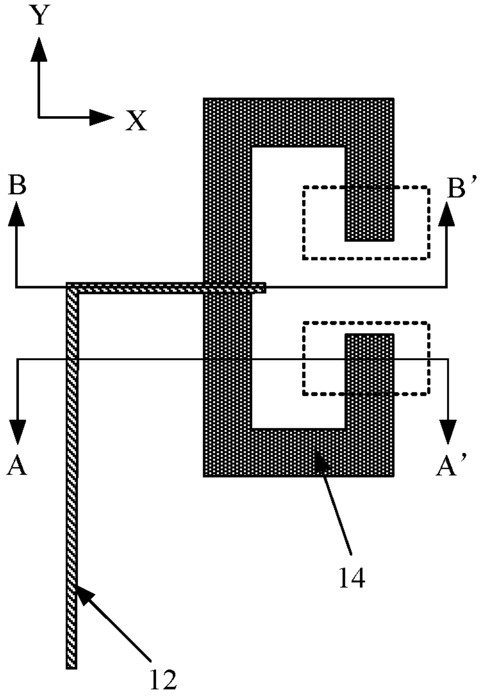
FIG. 6 is a top view of signal lines on a surface of a first substrate in a phase shifter according to another embodiment of the present disclosure.
Figure 7:
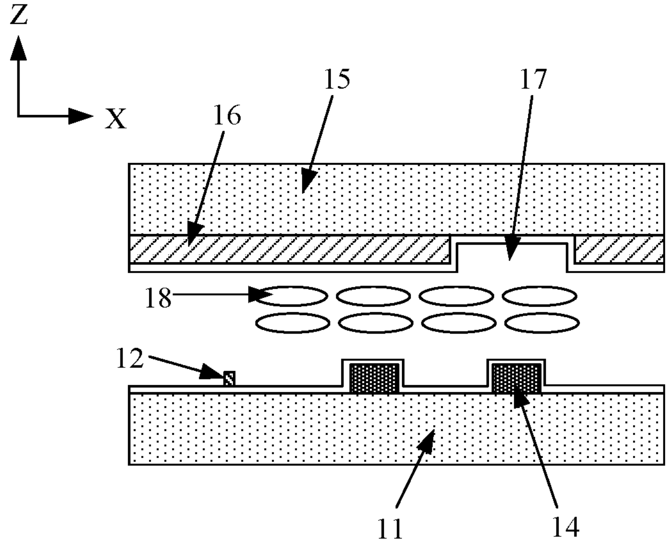
FIG. 7 is a sectional view of the phase shifter shown in FIG. 6 in an A-A' direction.
Figure 8:
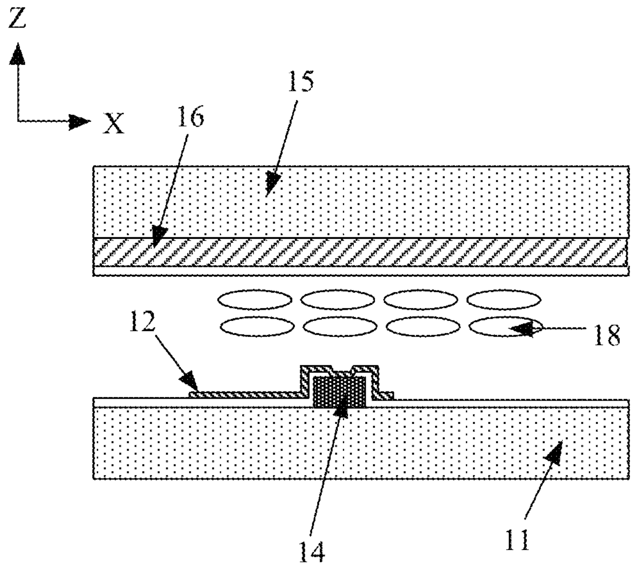
FIG. 8 is a sectional view of the phase shifter shown in FIG. 6 in a B-B' direction.

In a case that the bias line 12 is made of an oxide conductive layer, since the bias line 12 and the radio frequency transmission line 14 are made of two different conductive materials, it is required to separately prepare the bias line 12 and the radio frequency transmission line 14. In a first manner, as shown in FIG. 4 and FIG. 5, the bias line 12 is prepared first, and then the radio frequency transmission line 14 is prepared. In a second manner, as shown in FIG. 6 to FIG. 8, the radio frequency transmission line 14 is prepared first, and then the bias line 12 is prepared.

Referring to FIG. 4 and FIG. 5, FIG. 4 is atop view of signal lines on a surface of a first substrate in a phase shifter according to an embodiment of the present disclosure, and FIG. 5 is a sectional view of the phase shifter shown in FIG. 4 in an A-A' direction. Compared to the phase shifter shown in FIG. 1 to FIG. 3, in the phase shifter shown in FIG. 4 and FIG. 5, the bias line 12 is prepared using a thinner oxide conductive layer. A first insulating layer 191 is covered on the surfaces of the first substrate 11 and the bias line 12. The radio frequency transmission line 14 is arranged on a surface of the first insulating layer 191 away from the first substrate 11. A second insulating layer 192 is covered on a surface of the radio frequency transmission line 14 away from the first substrate 11 and on a surface of the first insulating layer 191. A connection end, connected to the bias line 12, is arranged in a connection region, and is not shown in FIG. 4 and FIG. 5. At a position where the radio frequency transmission line 14 intersects with the bias line 12, the radio frequency transmission line 14 is electrically connected to the bias line 12 through a conductive hole. The first insulating layer 191 and the second insulating layer 192 are arranged to protect the radio frequency transmission line 14, affecting the reliability of the connection between the radio frequency transmission line 14 and the bias line 12 due to oxidation of the radio frequency transmission line 14 caused by a high-temperature preparation process.

In the phase shifter shown in FIG. 4 and FIG. 5, since the oxide conductive layer is transparent and cannot be reused as an alignment mark, it is required to arrange at least six mask layers in preparing a film structure on the surface of the first substrate 11. A first mask layer is arranged for preparing an alignment mark on the surface of the first substrate 11. A second mask layer is arranged for preparing the bias line 12. A third mask layer is arranged for preparing the first insulating layer 191. A fourth mask layer is arranged for preparing the radio frequency transmission line 14. A fifth mask layer is arranged for preparing the second insulating layer 192. A sixth mask layer is arranged for preparing the connection end. In this way, the alignment mark may be a Mo layer, the bias line 12 may be an ITO layer, the first insulating layer 191 may be a SiNx layer, the radio frequency transmission line 14 may be a Cu layer, the second insulating layer 192 may be a SiNx layer, and the connection end may be a ITO layer. Thus, a film structure of Mo-ITO-SiNx-Cu-SiNx-ITO is formed.

In the embodiments of the present disclosure, the insulating layers may be silicon nitride film layers or other inorganic film layers, which is not limited in the embodiments of the present disclosure.

In the first manner shown in FIG. 4 and FIG. 5, based on the bias line 12 prepared using a single oxide conductive layer, the choke effect may be significantly improved, and the bias isolation may be reduced to below −100 dB, to almost realize complete isolation. However, in the first manner, a large number of mask layers are required, resulting in a high manufacturing cost. In order to reduce the number of the mask layers, the second manner shown in FIG. 6 to FIG. 8 may be adopted.

Referring to FIG. 6 to FIG. 8, FIG. 6 is atop view of signal lines on a surface of a first substrate in a phase shifter according to another embodiment of the present disclosure, FIG. 7 is a sectional view of the phase shifter shown in FIG. 6 in an A-A' direction, and FIG. 8 is a sectional view of the phase shifter shown in FIG. 6 in a B-B' direction. Compared to the first manner shown in FIG. 4 and FIG. 5, in the phase shifter shown in FIG. 6 to FIG. 8, the radio frequency transmission line 14 is prepared first and then the bias line 12 is prepared.

Compared with the first manner, in the second manner, the radio frequency transmission line 14 is un-transparent, and the metal layer where the radio frequency transmission line 14 is arranged may be reused to prepare an alignment mark, and the first mask layer in the first manner may be omitted. Since it is unnecessary to prepare the insulating layer under the bias line 12, the third mask layer in the first manner may be omitted. The oxide conductive layer above the bias line 12 is not oxidized similar to the metal materials, and the oxide conductive layer may be reused to prepare the connection end in preparing the bias line 12, and thus the sixth mask layer may be omitted. Therefore, in the second manner, three mask layers are required to respectively prepare the radio frequency transmission line 14, the insulating layer on the surface of the radio frequency transmission line 14, and the bias line 12, to greatly reduce the number of the mask layers and reducing the manufacturing cost. In second manner, the radio frequency transmission line 14 may be a Cu layer, the insulating layer on the surface of the radio frequency transmission line 14 may be a SiNx layer, and the bias line 12 may be an ITO layer. Thus, a film structure of Cu-SiNx-ITO is formed.

In the second manner shown in FIG. 6 to FIG. 8, a phase shifter with a good bias isolation may be prepared at a low cost. It is required to configure the bias line 12 in an extension direction of the bias line 12 to intersect with the radio frequency transmission line 14 in an extension direction of the radio frequency transmission line 14, and to define a conductive hole for the electrical connection between the bias line 12 and the radio frequency transmission line 14 at a position where the bias line 12 intersects with the radio frequency transmission line 14. As described above, in order to ensure the choke effect of the bias line 12, the line width of the bias line 12 is configured to be less than the line width of the radio frequency transmission line 14. Due to the large thickness of the radio frequency transmission line 14 made of a metal material, it is required for the thin bias line 12 to cross the radio frequency transmission line 14 with the large thickness. The width of a position where the bias line 12 extends upwards is equal to the line width of the bias line 12. A smaller width of the position where the bias line 12 extends upwards indicates that breakage is more likely to occur, affecting the electrical connection between the bias line 12 and the radio frequency transmission line 14.

It is required to prepare the oxide conductive layer, used for preparing the bias line 12, with a high-temperature coating process such as a CVD (chemical vapor deposition) process. The insulating layer accumulates a large stress during the high-temperature coating process, and then the insulating layer releases the stress and shrinks in a cooling process after high-temperature coating process, resulting in that the bias line 12 is broken due to the change of stress.

To reduce the bias isolation, reduce the leakage and improve the reliability of the electrical connection between the bias line 12 and the radio frequency transmission line 14, operations in the following embodiments may be performed.

Figure 9:
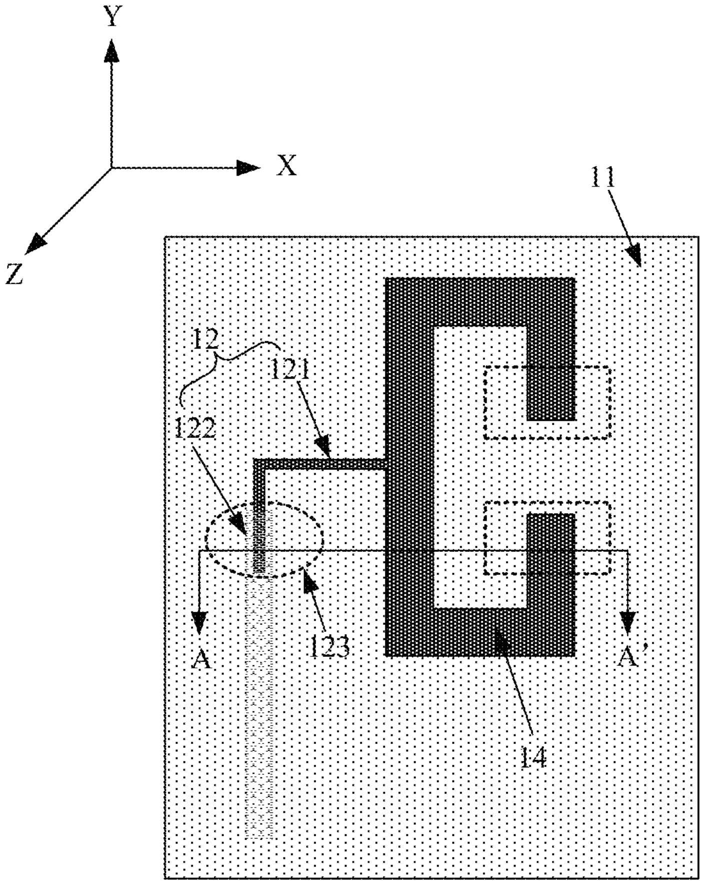
FIG. 9 is a top view of signal lines on a surface of a first substrate in a phase shifter according to another embodiment of the present disclosure.

Referring to FIG. 9, FIG. 9 is a top view of signal lines on a surface of a first substrate in a phase shifter according to another embodiment of the present disclosure. The phase shifter includes: a first substrate 11, a radio frequency transmission line 14 arranged on a side of the first substrate 11, and a bias line 12 connected to the radio frequency transmission line 14.

The bias line 12 includes a first wire 121 and a second wire 122. A sheet resistance of the second wire 122 is greater than a sheet resistance of the radio frequency transmission line 14. The first wire 121 and the radio frequency transmission line 14 are connected to each other and form an integrated structure. A line width of the first wire 121 is less than a line width of the radio frequency transmission line 14. The second wire 122 and the first wire 121 form a lapping region 123 on an extension direction of the first wire 121. In the lapping region 123, the second wire 122 is arranged on a side of the first wire 121 away from the first substrate 11. In a direction (a Z-axis direction described below) perpendicular to a plane where the first substrate 11 is located, the second wire 122 covers the first wire 121.

In order to facilitate illustrating relative positions and directions, in the drawings of the embodiments of the present disclosure, a three-dimensional Cartesian coordinate system is established by defining the plane where the first substrate 11 is located as an XY plane where an X axis intersects with a Y axis and defining a direction perpendicular to the plane where the first substrate 11 is located as a Z axis.

In the phase shifter shown in FIG. 9, the first wire 121 and the radio frequency transmission line 14 are connected and form an integrated structure on a same layer without conductive holes, ensuring the reliable electrical connection between the bias line 12 and the radio frequency transmission line 14, reducing the connection impedance of the bias line 12 and the radio frequency transmission line 14, and reducing the loss of the bias signal transmitted from the bias line 12 to the radio frequency transmission line 14. The line width of the first wire 121 is less than the line width of the radio frequency transmission line 14, and the first wire 121 has a larger inductance, reducing the leakage of the radio frequency signal from the radio frequency transmission line 14 to the bias line 12.

In the embodiments of the present disclosure, both the bias line 12 and the radio frequency transmission line 14 are conductive wires, and the conductive wires may be set as straight lines, broken lines, spiral lines, or the like according to requirements. The extension direction of the conductive wire on the first substrate 11 may be set based on the wiring space on the first substrate 11, which is not limited in the embodiments of the present disclosure. The length of the conductive wire is equal to a length of an actual extension track of the conductive wire, the line width of the conductive wire is equal to the line width of the conductive wire on the surface of the first substrate 11, and the thickness of the conductive wire is equal to a size of the conductive wire in the Z-axis direction.

In the vertical line-cross manner shown in FIG. 6, the extension direction of the bias line 12 intersects with the extension direction of the radio frequency transmission line 14. As shown in FIG. 6, a part of the bias line 12 extending in the X-axis direction vertically intersects with a part of the radio frequency transmission line 14 extending in the Y-axis direction. In a case that a crack, having a length equal to the line width of the bias line 12, appears in the Y-axis direction, the bias line 12 is broken, seriously affecting the reliability of the electrical connection between the bias line 12 and the radio frequency transmission line 14. In the embodiment according to the present disclosure, the first wire 121 of the bias line 12 and the radio frequency transmission line 14 are arranged on a same layer and form an integrated structure, ensuring a reliable and stable connection between the bias line 12 and the radio frequency transmission line 14.

As shown in FIG. 9, an extension path of the second wire 122 partially overlaps with an extension path of the first wire 121 to form the lapping region 123. The extension path is the actual extension path of the conductive wire on the surface of the first substrate 11. As shown in FIG. 9, each of the first wire 121 and the second wire 122 includes a conductive wire extending in the Y-axis direction. The first wire 121 and the second wire 122 extend in the Y-axis direction and partially overlap to form the lapping region 123. The line width of the second wire 122 at an upwards-extending position is equal to the length of the overlapping region of the first wire 121 and the second wire 122 of the bias line 12 (that is, the size of the lapping region 123 in the Y axis). The line width of the second wire 122 at the upwards-extending position is large, facilitating buffering and release of the stress on the insulating layer below the second wire 122, and to prevent the second wire 122 from being broken caused by a change of the stress on the insulating layer below the second wire 122. In addition, the first wire 121 and the second wire 122 of the bias line 12 form the lapping region 123, thus a crack, having a length equal to the line width of the bias line 12 and in the Y-axis direction, does not affect the electrical connection between the first wire 121 and the second wire 122. It can be seen that the first wire 121 and the second wire 122 of the bias line 12 shown in FIG. 9 are reliably and stably connected.

It can be seen from the above description that the first wire 121 and the second wire 122 of the bias line 12 form the lapping region 123, and the second wire 122 is reliably and stably attached to the first wire 121, reducing a risk that the second wire 122 is broken at the upwards-extending position. In one embodiment, the first wire 121 and the second wire 122 of the bias line 12 may be electrically connected to each other in a large area in the lapping region 123, improving the reliability of the electrical connection between the first wire 121 and the second wire 122 of the bias line 12.

In addition, the sheet resistance of the second wire 122 is configured to be greater than the sheet resistance of the radio frequency transmission line 14, increasing the inductance of the bias line 12, increasing the difference between the inductance of the bias line 12 and the inductance of the radio frequency transmission line 14, and to further reduce the leakage of the radio frequency signal from the radio frequency transmission line 14 to the bias line 12.

Experimental testing is performed on the resistor of the bias line 12, and the testing result shows that the phase shifter designed based on the lapping region 123 has stable and reliable electrical connections. Based on simulation and experimental data, it shows that the bias isolation may be reduced to less than −50 dB with the design. In one embodiment, the order in which the film layers are prepared is similar to the order shown in FIG. 6, and therefore at least three mask layers may be omitted compared with the manner shown in FIG. 4.

As shown in FIG. 9, the line width of the second wire 122 is not less than the line width of the first wire 121, and the second wire 122 covers the first wire 121 in the lapping region 123. In the lapping region 123, the second wire 122 extends upwards on three sides of the first wire 123 in the length direction, realizing line-cross design in the length direction. In FIG. 6 and FIG. 9, vertical crossing of different lines is avoided, greatly increasing an area of the overlapping region of the first wire 121 and the second wire 122 of the bias line 12 at a crossing position. In one embodiment, the width of the upwards-extending position is increased in the length direction of the wires according to the design, it is only required for the second wire 122 to cover the first wire 121 to form the lapping region 123 in the length direction without significantly increasing the width of the bias line 12.

Figure 10:
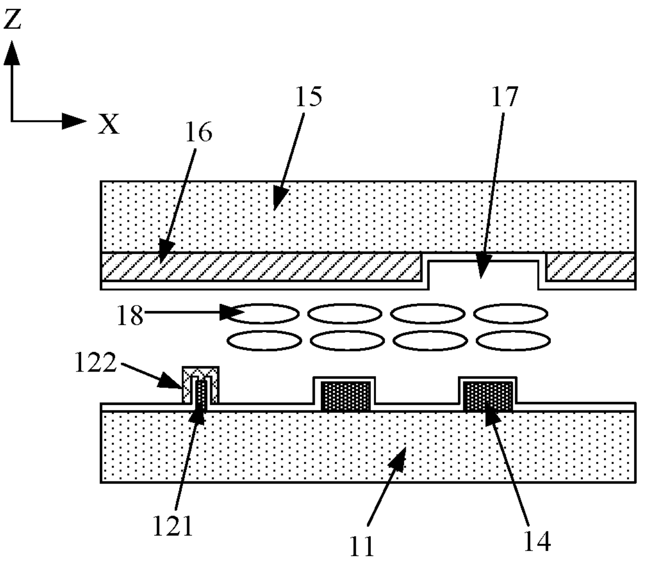
FIG. 10 is a sectional view of the phase shifter shown in FIG. 9 in an A-A' direction.

Referring to FIG. 10, FIG. 10 is a sectional view of the phase shifter shown in FIG. 9 in an A-A' direction. The phase shifter further includes a second substrate 15, a dielectric layer 18, and a reference electrode 16. The second substrate 15 is arranged opposite to the first substrate 11, and is arranged on a side of the radio frequency transmission line 14 away from the first substrate 11. The dielectric layer 18 is arranged between the second substrate 15 and the first substrate 11. The reference electrode 16 is arranged on a side of the second substrate 12 close to the first substrate 11. In a case that the dielectric layer 18 is a liquid crystal layer, it is required to arrange a packaging structure at edges of the first substrate 11 and the second substrate 12 for packaging and protecting the liquid crystal layer to prevent leakage of the liquid crystal material.

Two openings 17, respectively corresponding to two ends of the radio frequency transmission line 14, are defined on the reference electrode 16, facilitating reception and transmission of radio frequency signals by the radio frequency transmission line 14. The reference electrode 16 may be configured as a Cu layer.

In an embodiment, the sheet resistance of the second wire 122 is configured to be at least 1000 times the sheet resistance of the radio frequency transmission line 14. The difference between the sheet resistance of the second wire 122 and the sheet resistance of the radio frequency transmission line 14 is at least three orders of magnitude or more, and the inductance of the bias line 12 is much greater than the inductance of the radio frequency transmission line 14, improving the choke effect of the bias line 12 and preventing leakage of radio frequency signals. As described above, the second wire 122 may be an oxide conductive layer, such as ITO or IZO.

Figure 11:
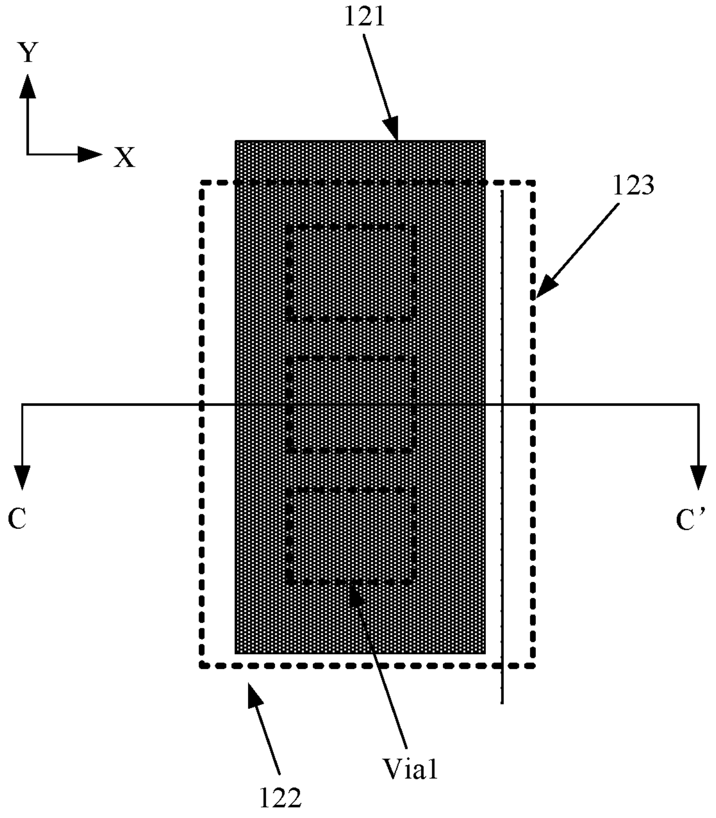
FIG. 11 is a locally enlarged view of a first wire and a second wire in a bias line in a lapping region.
Figure 12:
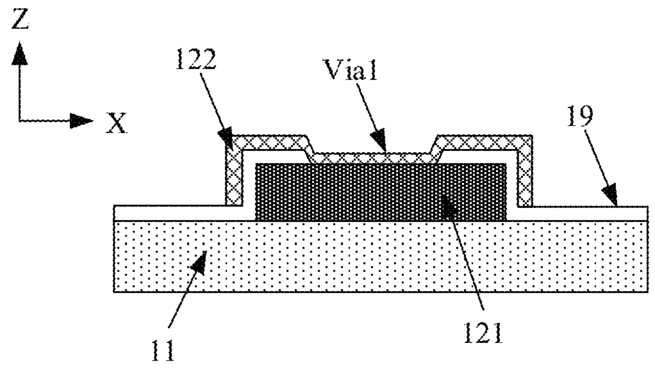
FIG. 12 is a sectional view of the first wire and the second wire in the bias line in the lapping region shown in FIG. 11 in a C-C' direction.

Referring to FIG. 11 and FIG. 12, FIG. 11 is locally enlarged view of a first wire and a second wire in a bias line in a lapping region, and FIG. 12 is a sectional view of the first wire and the second wire in the bias line in the lapping region shown in FIG. 11 in a C-C' direction. As shown in FIG. 9 to FIG. 12, the first wire 121 and the radio frequency transmission line 14 are arranged in a first conductive layer, the second wire 122 is arranged in a second conductive layer. An insulating layer 19 is arranged between the first conductive layer and the second conductive layer. In the lapping region 123, the second wire 122 is electrically connected to the first wire 121 through multiple first conductive through holes Via1. The first wire 121 and the second wire 122 of the bias line 12 form the lapping region 123, and the lapping region 123 is a region in which the first wire 121 and the second wire 122 are overlapped in the extension direction of the first wire 121 and in the extension direction of the second wire 122. Therefore, multiple first conductive through holes Via1 are arranged due to the large space of the lapping region 123, and the first wire 121 and the second wire 122 are electrically connected reliably and stably.

The first conductive through hole Via1 may be square, circular, triangular or elliptical, which is not limited in the embodiments of the present disclosure. In the lapping region 123, the proportion of the area of the first conductive through holes Via1 per unit area is large, and the first wire 121 and the second wire 122 of the bias line 12 are electrically connected reliably and stably. As shown in FIG. 11, theoretically, the first wire 121 and the second wire 122 of the bias line 12 may be electrically connected with a large area in the lapping region 123 by defining a rectangular conductive through hole with long sides parallel to the Y axis. In preparing a single rectangular conductive through hole, it is required to etch a large-size through hole, thus it is difficult to control the etching accuracy. In addition, the insulating layer covered on the surface of the radio frequency transmission line 14 is a thin inorganic layer. The difficulty in controlling the etching accuracy may cause insufficient etching or excessive etching, resulting in poor morphology of the etched hole, and affecting the quality of the final prepared conductive through hole. Therefore, in the embodiments of the present disclosure, multiple first conductive through holes Via1 are defined in the lapping region 123 for connecting the first wire 121 and the second wire 122 of the bias line 12.

In an embodiment, for a lapping region 123 with a predetermined area, an area S1 of the first wire 121 with a small line width is determined. Based on the area S1, the sum of the areas of all the first conductive through holes Via1 is configured as S2, and $$\frac{S2}{S1} \geq 50\%,$$

and the first wire 121 and the second wire 122 of the bias line 12 are electrically contacted well in the lapping region 123. In an embodiment, $$\frac{S2}{S1} \geq 75\%.$$

As shown in FIG. 11, in the lapping region 123, the multiple first conductive through holes Via1 are arranged in a column along an extension direction of the length of the lapping region 123. The multiple first conductive through holes Via1 may be arranged in multiple columns in the extension direction of the length of the lapping region 123. In an embodiment, in an XY plane, a distance between two adjacent first conductive through holes Via1 is not less than 5 μm based on the precision of the punching process. A minimum size of the first conductive through holes Via1 in the XY plane is not less than 5 μm. In a case that the first conductive through holes Via1 are rectangular holes as shown in FIG. 11, the lengths of the sides of the rectangular holes, respectively in the direction parallel to the X axis and in the direction parallel to the Y axis, are not less than 5 μm. In a case that the first conductive through holes Via1 are circular holes, the apertures of the circular holes are not less than 5 μm. In a direction along the line width of the first wire 121, a maximum size of the first conductive through holes Via1 is less than the line width of the first wire 121. In a direction along the length of the first wire 121, a maximum size of the first conductive through holes Via1 may be configured based on the layout density of the first conductive through holes Via1. The first conductive through holes Via1 are arranged for connecting the second wire 122 and the first wire 121. Therefore, in the XY plane, the first conductive through holes Via1 are arranged between two side walls of the first wire 121. In addition, a distance between a first conductive through hole Via1 and a side wall of the first wire 121 is not less than 4 μm due to the precision of the punching process.

As shown in FIG. 12, in the lapping region 123, the second wire 122 at least partially overlaps with the first wire 121 in a first direction. The first direction is parallel to the plane where the first substrate 11 is located, and the first direction intersects with the extension direction of the first wire 121. As shown in FIG. 12, the first direction parallel to the direction of the X axis. In this way, the second wire 122 overlaps with the side walls of the first wire 121 in the first direction and covers part of the side walls of the first wire 121.

In the embodiments of the present disclosure, the side walls of the first wire 121 may be perpendicular to the plane where the first substrate 11 is located. In one embodiment, as shown in FIG. 13, a predetermined slope may be configured between each of the side walls of the first wire 121 and the plane where the first substrate 11 is located.

Figure 13:
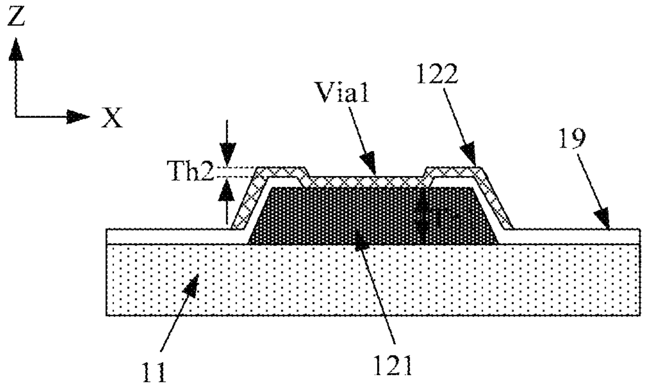
FIG. 13 is a sectional view of a bias line along a length direction in a lapping region according to an embodiment of the present disclosure.

Referring to FIG. 13, FIG. 13 is a sectional view of a bias line along a length direction in a lapping region according to an embodiment of the present disclosure. In the direction perpendicular to the plane where the first substrate 11 is located, a thickness Th1 of the first wire 121 is greater than a thickness Th2 of the second wire 122. In a direction from the first substrate 11 to the first wire 121, the width of the first wire 121 gradually increases. Thus, each of the side walls of the first wire 121 forms a sharp slope, reducing an upwards-extending angle of the second wire 122 relative to the side wall of the first wire 121, and to prevent the second wire 122 from being broken due to extending upwards.

In an embodiment of the present disclosure, the length of the first wire 121 is not less than $n\lambda/4$ and not greater than $n\lambda/2$, where n represents a positive integer and $\lambda$ represents a center wavelength of the radio frequency signal that can be transmitted in the radio frequency transmission line 14. Based on a structure of an open circuit load for the radio frequency signal, the first wire 121 having a length within the above range may reflect the radio frequency signal, reducing the leakage of the radio frequency signal from the radio frequency transmission line 14 to the bias line 12. Therefore, with the first wire 121 having a length within the above range, a good choke effect can be achieved, reducing the bias isolation.

In an embodiment, the length of the first wire 121 is set to $n\lambda/4$. In this case, the first wire 121 may best reflect the radio frequency signal, achieving a best choke effect and best reducing the bias isolation.

The frequency band of the radio frequency signal that can be transmitted and received by the radio frequency transmission line 14 is related to the length of the radio frequency transmission line 14 and is not related to the shape of the radio frequency transmission line 14. Therefore, the length of the radio frequency transmission line 14 may be configured based on the requirements for the communication frequency band of the radio frequency signal, which is not limited in the embodiments of the present disclosure. Therefore, the center wavelength corresponds to a center frequency of the frequency band of the radio frequency signal that can be transmitted and received by the radio frequency transmission line 14.

Figure 14:
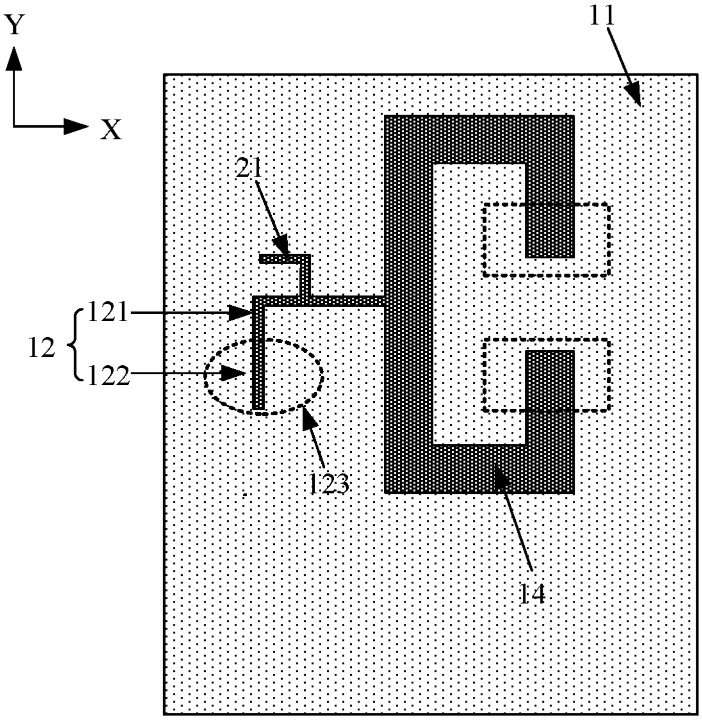
FIG. 14 is a top view of signal lines on a surface of a first substrate in a phase shifter according to another embodiment of the present disclosure.

Referring to FIG. 14, FIG. 14 is a top view of signal lines on a surface of a first substrate in a phase shifter according to another embodiment of the present disclosure. On the basis of the above embodiments, the phase shifter further includes a first choke branch 21. The first choke branch 21 and the first wire 121 are connected and from an integrated nit structure. A length of the first choke branch 21 is equal to $n_1\lambda/4$ where $n_1$ represents a positive integer and $\lambda$ represents a center wavelength of a radio frequency signal transmitted by the radio frequency transmission line. With the first choke branch 21, the bias isolation of the bias line 12 may be reduced, improving the choke effect. In an embodiment, $n_1=1$, and the same choke effect may be achieved using a first choke branch 21 having a minimum length, facilitating the layout of the signal lines on the surface of the first substrate 11.

In an embodiment of the present disclosure, the first choke branch 21 and the first wire 121 may be arranged on a same conductive layer and form an integrated structure. In one embodiment, the first choke branch 21 and the first wire 121 may be arranged on different conductive layers and are connected to each other through a conductive through hole.

Figure 15:
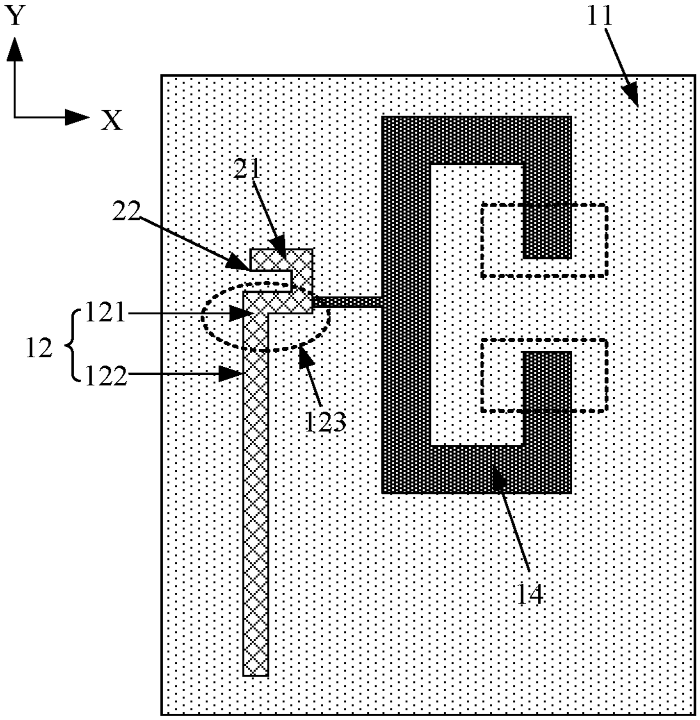
FIG. 15 is a top view of signal lines on a surface of a first substrate in a phase shifter according to another embodiment of the present disclosure.

Referring to FIG. 15, FIG. 15 is a top view of signal lines on a surface of a first substrate in a phase shifter according to another embodiment of the present disclosure. On the basis of the embodiment shown in FIG. 14, the phase shifter shown in FIG. 15 further includes a second choke branch 22. The second choke branch 22 and the second wire 122 are connected and form an integrated structure. A length of the second choke branch 22 is equal to $n_2\lambda/4$, where $n_2$ represents a positive integer. With the second choke branch 22, the bias isolation of the bias line 12 may be reduced, improving the choke effect. In an embodiment, $n_2=1$, and the same choke effect may be achieved using a second choke branch 22 having a minimum length, facilitating the layout of the signal lines on the surface of the first substrate 11.

In an embodiment of the present disclosure, the second choke branch 22 and the second wire 122 may be arranged in a same conductive layer and form an integrated structure. In one embodiment, the second choke branch 22 and the second wire 122 may be arranged in different conductive layers and are connected to each other through a conductive through hole.

The second choke branch 22 is arranged not to be in the extension direction of the first wire 121, and an extension direction of the second choke branch 22 intersects with the extension direction of the first wire 121.

In the embodiments of the present disclosure, one of the first choke branch 21 and the second choke branch 22 may be arranged or both the first choke branch 21 and the second choke branch 22 may be arranged to reduce the bias isolation and improve the choke effect.

In an embodiment, the bias line 12 includes a first choke branch 21 and a second choke branch 22. A length of the first choke branch 21 is equal to $m_1\lambda/4$, and a length of the second choke branch 22 is equal to $m_2\lambda/4$, where $m_1$ and $m_2$ represent positive integers. In the direction perpendicular to the plane where the first substrate 11 is located, the second choke branch 22 is arranged on a side of the first choke branch 21 away from the first substrate 11. The second choke branch 22 overlaps at least partially with the first choke branch 21. In an overlapping region, the second choke branch 22 covers the first choke branch 21.

In a case that the first choke branch 21 and the first wire 121 are arranged in a same conductive layer and the second choke branch 22 and the second wire 122 are arranged in a same conductive layer, the second choke branch 22 covers the first choke branch 21 in the overlapping region of the second choke branch 22 and the first choke branch 21. Since the first wire 121 and the second wire 122 of the bias line 12 form the lapping region 123, the second wire 122 and the overlapping region form an integrated structure in the lapping region 123, further increasing the line-cross region of the conductive layer where the second wire 122 is arranged and the conductive layer where the first wire 121 is arranged, significantly increasing the upwards-extending width, and further reducing the risk that the second wire 122 is broken at the line-cross position.

In a case that both the first choke branch 21 and the second choke branch 22 are arranged, the line width of the first choke branch 21 is equal to the line width of the first wire 121, and the line width of the second choke branch 22 is equal to the line width of the second wire 122. In the direction perpendicular to the plane where the first substrate 11 is located, the second choke branch 22 covers the first choke branch 21. The second choke branch 22 may be arranged to completely cover the first choke branch 21 to maximize the line-cross region and increase the upwards-extending width.

The line width of the first choke branch 21 is set to be equal to the line width of the first wire 121, and the first choke branch 21 and the first wire 121 having the integrated structure may be prepared synchronously. The line width of the second choke branch 22 is set to be equal to the line width of the second wire 122, and the second choke branch 22 and the second wire 122 having the integrated structure may be prepared synchronously. Thus, it is convenient to lay out the signal lines on the surface of the first substrate 11.

Figure 16:
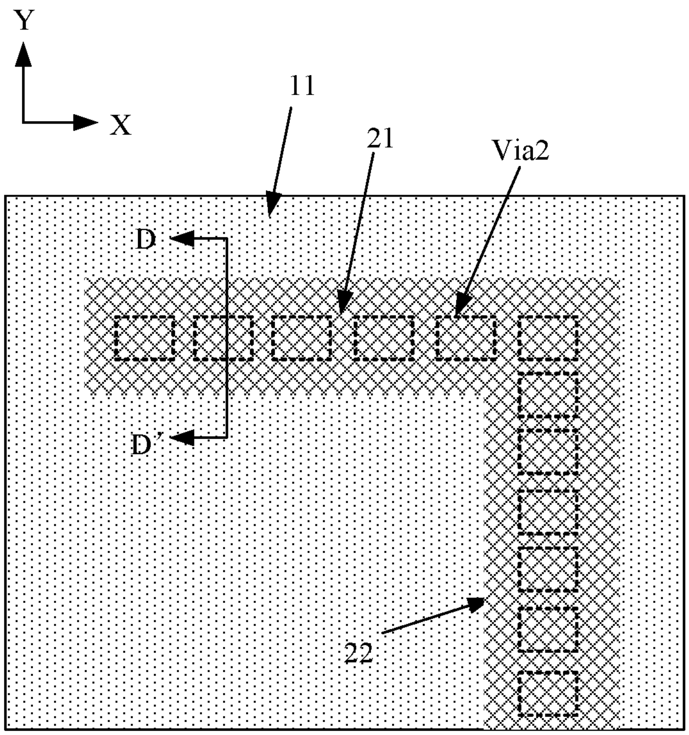
FIG. 16 is a locally enlarged view of the phase shifter shown in FIG. 18 in an overlapping region of a second choke branch and a first choke branch.
Figure 17:
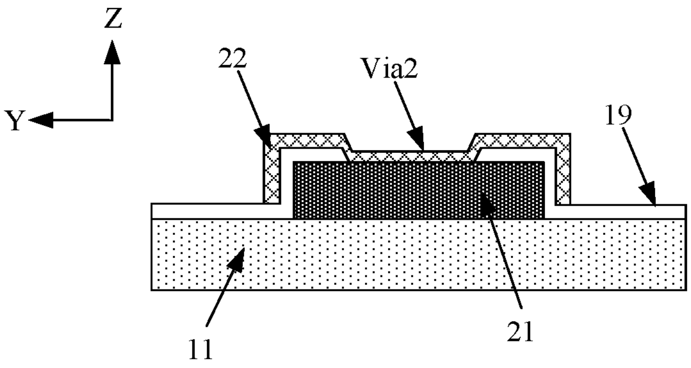
FIG. 17 is a sectional view of the phase shifter in the overlapping region of the second choke branch and the first choke branch shown in FIG. 16 in a D-D' direction.
Figure 18:
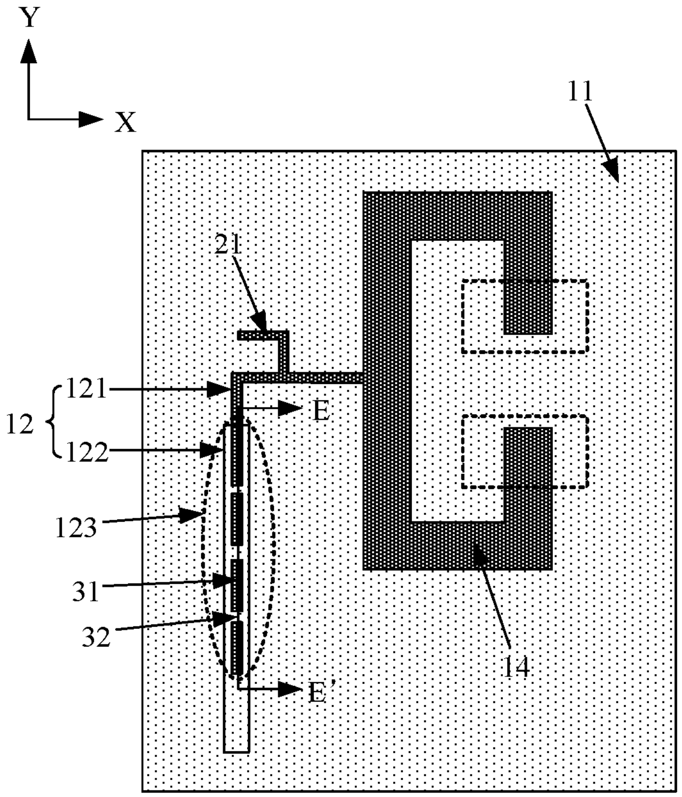
FIG. 18 is a top view of signal lines on a surface of a first substrate in a phase shifter according to another embodiment of the present disclosure.

Referring to FIG. 16 and FIG. 17, FIG. 16 is a locally enlarged view of the phase shifter shown in FIG. 18 in an overlapping region of a second choke branch and a first choke branch, and FIG. 17 is a sectional view of the phase shifter in the overlapping region of the second choke branch and the first choke branch shown in FIG. 16 in a D-D' direction. As shown in the drawings of the above embodiments, the first choke branch 21, the first wire 121 and the radio frequency transmission line 14 are arranged in a first conductive layer, the second choke branch 22 and the second wire 122 are arranged in a second conductive layer, and an insulating layer 19 is arranged between the first conductive layer and the second conductive layer. In the lapping region 123, the second wire 122 is connected to the first wire 121 through the first conductive through holes Via1. In the overlapping region of the second choke branch 22 and the first choke branch 21, the second choke branch 22 is connected to the first choke branch 21 through second conductive through holes. In this way, the second conductive through holes Via2 may be defined in the overlapping region of the second choke branch 22 and the first choke branch 21, improving the reliability and stability of the electrical connection between the first wire 121 and the second wire 122 of the bias line 12.

In the overlapping region of the first choke branch 21 and the second choke branch 22, the size and the layout of the second conductive through holes Via2 may be determined with reference to the design of the first conductive through holes Via1. In the XY plane, a distance between two adjacent second conductive through holes Via2 may be set to no less than 5 μm. A minimum size of the second conductive through holes Via2 on the XY plane is not less than 5 μm. In a case that the second conductive through holes Via2 are rectangular holes, the lengths of the sides of the rectangular holes, respectively in the direction parallel to the X axis and in the direction parallel to the Y axis, are not less than 5 μm. In a case that the second conductive through holes Via2 are circular holes, the apertures of the circular holes are not less than 5 μm. In a direction along the line width of the first choke branch 21, a maximum size of the second conductive through holes Via2 is less than the line width of the first choke branch 21. In a direction along the length of the first choke branch 21, a maximum size of the second conductive through holes Via2 is configured based on the layout density of the second conductive through holes Via2. The second conductive through holes Via2 are arranged for connecting the first choke branch 21 and the second choke branch 22. Therefore, in the XY plane, the second conductive through holes Via2 are arranged between two side walls of the first choke branch 21. Due to the precision of the punching process, a distance between a second conductive through hole Via2 and a side wall of the first choke branch 21 is not less than 4 μm.

Figure 19:
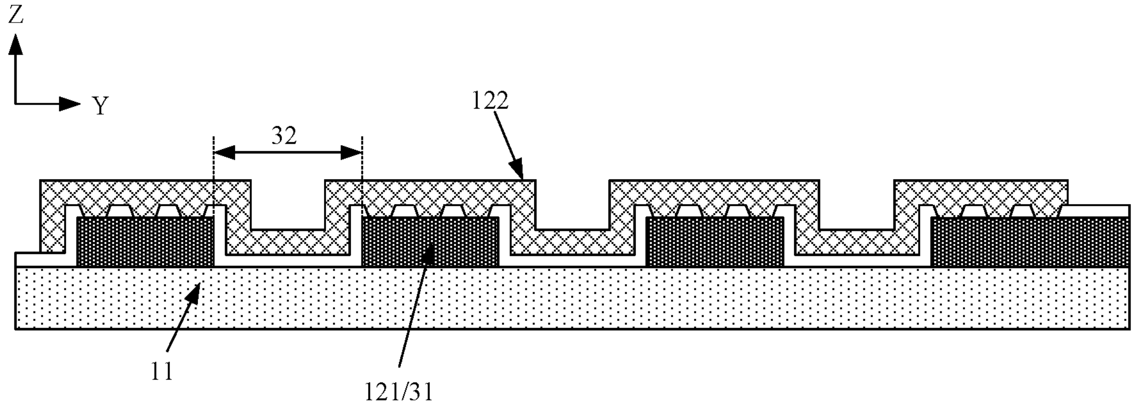
FIG. 19 is a sectional view of the phase shifter shown in FIG. 18 in an E-E' direction.

Referring to FIG. 18 and FIG. 19, FIG. 18 is a top view of signal lines on a surface of a first substrate in a phase shifter according to another embodiment of the present disclosure, and FIG. 19 is a sectional view of the phase shifter shown in FIG. 18 in an E-E' direction. On the basis of the above embodiments, in an embodiment, the first wire 121 includes multiple first wire segments 31 arranged in sequence along the extension direction of the first wire 121. A first gap 32 is arranged between any two adjacent first wire segments 31. The radio frequency transmission line 14 and the first wire segments 31 are connected to each other and form an integrated structure. Adjacent first wire segments 31 are connected to each other through the second wire 122. In the embodiment, the first wire 121 includes multiple first wire segments 31, further improving the choke effect of the bias line 12 and reducing the bias isolation. It should be noted that the embodiment shown in FIG. 18 is provided based on FIG. 14. Apparently, the first wire 121 may be configured to include multiple first wire segments 31 based on the above embodiments.

In a case where the first wire 121 includes multiple first wire segments 31, a length of the first wire segment 31 is not less than $n_3\lambda/4$ and not greater than $n_3\lambda/2$, where $n_3$ represents a positive integer, and λ represents the center wavelength of the radio frequency signal transmitted by the radio frequency transmission line.

The length of the first wire segment 31 is not less than $n_3\lambda/4$ and not greater than $n_3\lambda/2$, effectively improving the choke effect of the bias line 12, reducing the bias isolation, and to improve the effect of the bias line 12 isolating the radio frequency signal. In an embodiment, the length of the first wire segment 31 is configured to be $n_3\lambda/4$, improving the choke effect of the bias line 12.

In order to facilitate the preparation of the first wire 121, the first wire segments 31 may be configured to have a same length. Apparently, in other embodiments, at least two first wire segments 31 may be configured to have different lengths. The first wire segments 31 with different lengths correspond to different $n_3$.

In a case that the first wire 121 includes multiple first wire segments 31, the second wire 122 may have an overall structure as shown in FIG. 18, or the second wire 122 may have a segmented structure as described in the following embodiments.

Figure 20:
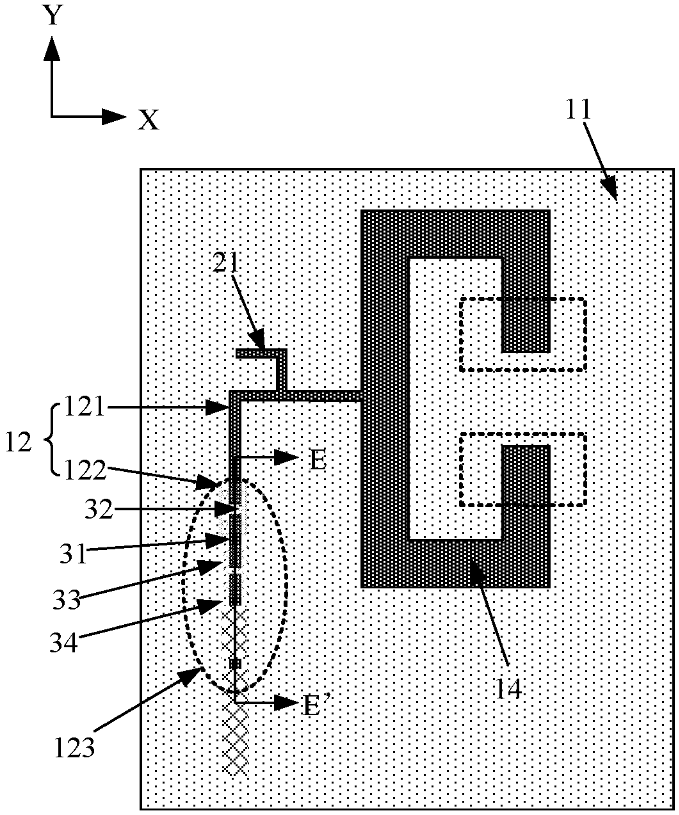
FIG. 20 is a top view of signal lines on a surface of a first substrate in a phase shifter according to another embodiment of the present disclosure.
Figure 21:
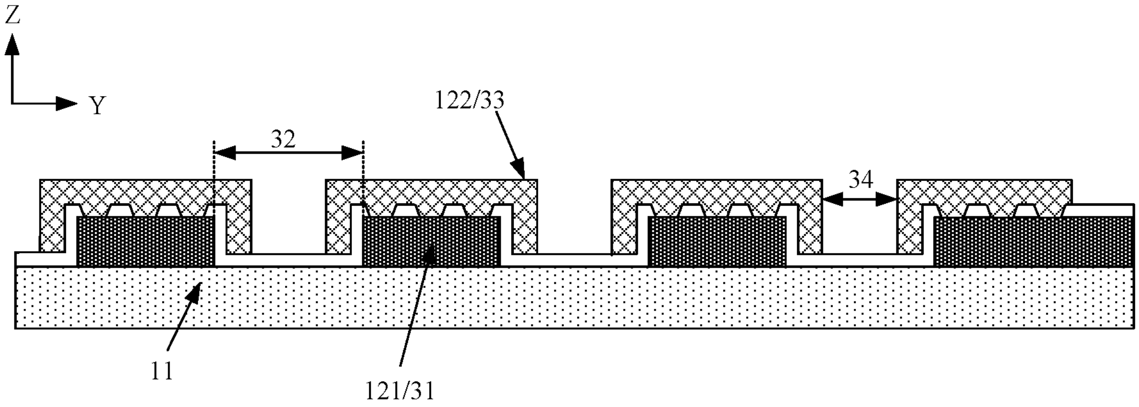
FIG. 21 is a sectional view of the phase shifter shown in FIG. 20 in an E-E' direction.

Referring to FIG. 20 and FIG. 21, FIG. 20 is a top view of signal lines on a surface of a first substrate in a phase shifter according to another embodiment of the present disclosure, and FIG. 21 is a sectional view of the phase shifter shown in FIG. 20 in an E-E' direction. On the basis of the above embodiments, in an embodiment, the second wire 122 includes multiple second wire segments 33 arranged in sequence. A second gap 34 is arranged between adjacent second wire segments 33. Adjacent first wire segments 31 are connected to each other based on a second wire segment 33. In the embodiment, the second wire 122 includes multiple second wire segments 33 arranged in sequence, further improving the choke effect of the bias line 12 and reducing the bias isolation.

Figure 22:
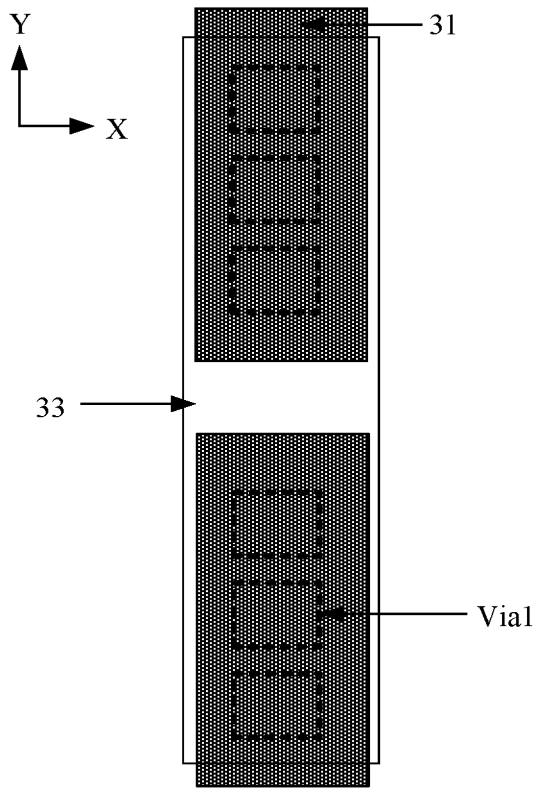
FIG. 22 is a locally enlarged view of a first wire and a second wire in a bias line in a lapping region according to another embodiment.

Referring to FIG. 22, FIG. 22 is a locally enlarged view of a first wire and a second wire in a bias line in a lapping region. Based on the sectional views in the above embodiments and FIG. 22, the first wire 121 and the radio frequency transmission line 14 are arranged in a first conductive layer, the second wire 122 is arranged in a second conductive layer, and a first insulating layer 19 is arranged between the first conductive layer and the second conductive layer. The lapping region 123 includes overlapping regions of the second wire segments 33 and the first wire segments 31 in the direction perpendicular to the first substrate 11. The second wire segments 33 and the first wire segments 31 are connected via multiple first conductive through holes Via1 in the overlapping regions.

Two adjacent first wire segments 31 are connected to each other through a second wire segment 33, and the two adjacent first wire segments 31 overlap with the same second wire segment 33 to form overlapping regions. In the embodiment shown in FIG. 22, illustration is provided by taking three first conductive through holes Via1 arranged in a column in each of the overlapping regions as an example. It is apparently that the number and arrangement of through holes in each of the overlapping regions may be determined according to requirements, and are not limited to the embodiment shown in FIG. 22.

In an embodiment of the present disclosure, the second wire 122 includes m second wire segments 33 arranged in sequence. In an extension direction of the bias line 12 away from the radio frequency transmission line 14, the m second wire segments 33, from a first second wire segment to an m-th second wire segment, are arranged in sequence, where m represents a positive integer greater than 1. Each of the first second wire segment to an (m−1)th second wire segment is configured to be not less than $n_4\lambda/4$ and not greater than $n_4\lambda/2$, where $n_4$ represents a positive integer, and $\lambda$ represents a center wavelength of a radio frequency signal transmitted by the radio frequency transmission line 14. An end of the m-th second wire segment is connected to a first wire segment 31 farthest from the radio frequency transmission line 14, and another end of the m-th second wire segment extends to a connection region.

Each of the first second wire segment to the m-th second wire segment is configured to be not less than $n_4\lambda/4$ and not greater than $n_4\lambda/2$, effectively improving the choke effect of bias line 12, reducing the bias isolation and effectively improving the effect of the bias line 12 isolating the radio frequency signal. In an embodiment, a length of each of the first second wire segment to the m-th second wire segment is configured to be equal to $n_3\lambda/4$, improving the choke effect of the bias line 12.

In order to facilitate the preparation of the second wire 122, the first second wire segment to the m-th second wire segment may be configured to have a same length. Apparently, in other embodiments, at least two of the first second wire segment to the m-th second wire segment may be configured to have different lengths. The second wire segments 33 with different lengths correspond to different $n_4$.

In an embodiment of the present disclosure, the first wire segment 31 is configured to have a length of $\lambda/4$, and each of the first second wire segment to the m-th second wire segment is configured to have a length of $\lambda/4$, and the bias line 12 includes a $\lambda/4$-cycle electromagnetic band gap (EBG) structure, further improving the choke effect of the bias line 12 and improving the isolation effect.

Based on the EBG structure in the bias line 12, reflection of radio frequency signals under a load terminal condition may be enhanced, to reduce a loss caused by leakage of the radio frequency signals from the bias line 12. In addition, dissipation caused by the leakage of the radio frequency signal may be avoided through echoes, achieving a positive feedback effect on the radio frequency signal. Therefore, the choke effect of the bias line 12 may be effectively improved and the isolation effect is improved.

Figure 23:
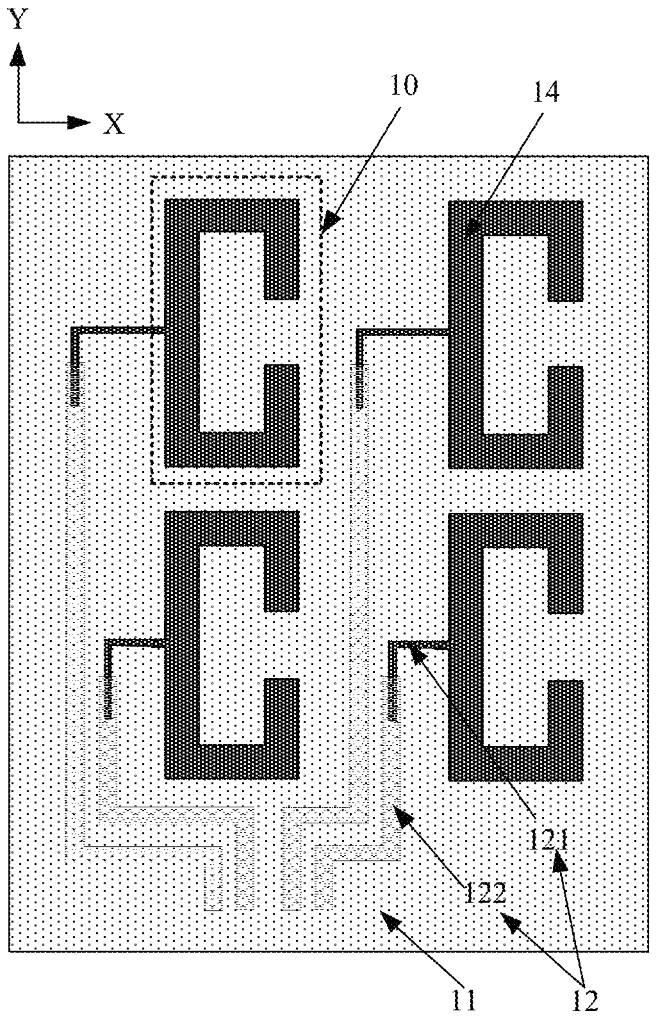
FIG. 23 is a top view of signal lines on a surface of a first substrate in a phase shifter according to another embodiment of the present disclosure.

Referring to FIG. 23, FIG. 23 is a top view of signal lines on a surface of a first substrate in a phase shifter according to another embodiment of the present disclosure. On the basis of the above embodiments, in an embodiment, the first substrate 11 is arranged with multiple device regions 10 that are arranged in an array. Each of the device regions 10 is arranged with a radio frequency transmission line 14. Each of radio frequency transmission lines 14 is connected to a bias line 12. Bias lines 12 extended out from a same side of the first substrate 11. In the embodiment, reference electrodes 16 corresponding to different device regions 10 may be arranged on a same conductive layer, and the reference electrodes 16 are connected to each other and form an integrated structure.

The bias lines 12 are configured to extend out from a same side of the first substrate 11, and the bias lines 12 extend from an extending-out region on the same side of the first substrate 11 to a connection region, and the bias lines 12 are connected to a control circuit in a same connection region, facilitating inputting bias signals. In a case that multiple device regions 10 are arranged, the device regions 10 may be arranged to form an array based on the above embodiments, not limited to the bias lines 12 shown in FIG. 23.

In a case that multiple device regions 10 are arranged, each of the device regions 10 may serve as a phase-shifter unit, and the phase shifter may serve as an array antenna.

As described above, the bias line 12 is configured to provide a bias signal for the radio frequency transmission line 14, adjusting the dielectric constant of the dielectric layer 18. In a case that the bias lines 12 extends out from a same side of the first substrate 11, the bias line 12 connected to the radio frequency transmission line 14 far from the extending-out region has a large length, and the bias line 12 connected to the radio frequency transmission line 14 close to the extending-out region has a small length, and the bias lines 12 connected to the radio frequency transmission lines 14 are difference in resistance, resulting in different voltage drops generated by the bias signals and differences in response speeds of different device regions 10 to the bias signals. In order to solve the problem, bias-signal transmission circuits where the bias lines 12 are arranged may be configured to have a same impedance or approximately same impedances, and the bias signals inputted to the radio frequency transmission lines 14 generate a same voltage drop or approximately same voltage drops, to reduce or even eliminate the difference in response speeds of different device regions 10 to the bias signals.

Figure 24:
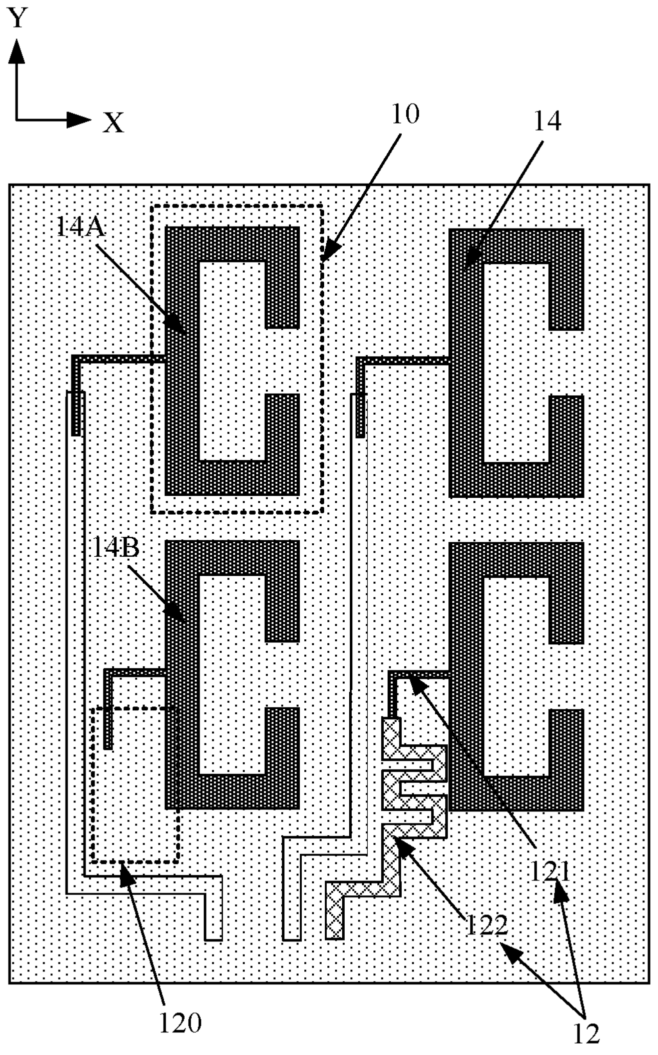
FIG. 24 is a top view of signal lines on a surface of a first substrate in a phase shifter according to another embodiment of the present disclosure.

Referring to FIG. 24, FIG. 24 is a top view of signal lines on a surface of a first substrate in a phase shifter according to another embodiment of the present disclosure. On the basis of the embodiment shown in FIG. 23, in an embodiment, for each of the radio frequency transmission lines 14, the radio frequency transmission line 14 include a first radio frequency transmission line 14A and a second radio frequency transmission line 14B, a distance between the first radio frequency transmission line 14A and the extending-out region is greater than a distance between the second radio frequency transmission line 14B and the extending-out region, and a bias line 12 connected to the second radio frequency transmission line 14B includes a polyline 120 with a number of bends in a same layer. Thus, the bias lines 12 respectively connected to the first radio frequency transmission line 14A and the second radio frequency transmission line 14B have a same length or approximately same lengths, and the bias lines 12 have a same resistance or approximately same resistances.

Based on polylines 120, the bias-signal transmission circuits where the radio frequency transmission lines 14 having different distances to the extending-out region have a same impedance or approximately same impedances, to reduce or even eliminate the difference in response speeds of different device regions 10 to the bias signals.

In the embodiment shown in FIG. 24, in a case that a first choke branch 21 and/or the second choke branch 22 are arranged, the first choke branch 21 and/or the second choke branch 22 connected to different bias lines 12 are configured with a same total resistance, avoiding a difference between impedances of different bias-signal transmission circuits caused by the choke branches.

Figure 25:
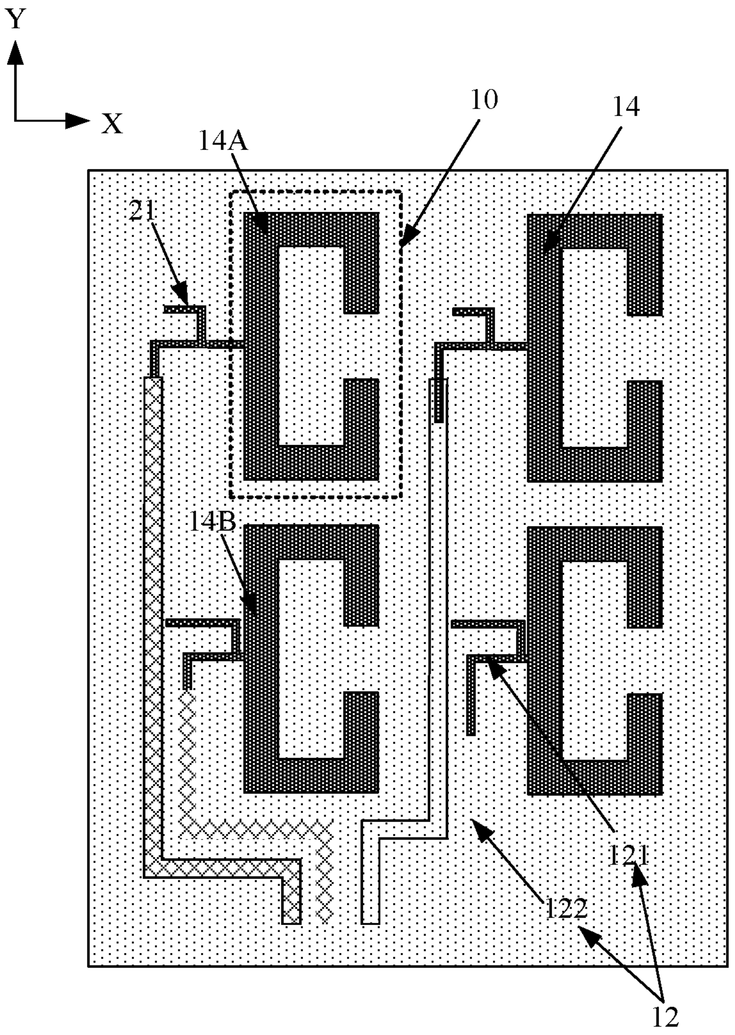
FIG. 25 is a top view of signal lines on a surface of a first substrate in a phase shifter according to another embodiment of the present disclosure.

Referring to FIG. 25, FIG. 25 is a top view of signal lines on a surface of a first substrate in a phase shifter according to another embodiment of the present disclosure. On the basis of the embodiment shown in FIG. 23, in an embodiment, for each of the radio frequency transmission lines 14, the radio frequency transmission line 14 includes a first radio frequency transmission line 14A and a second radio frequency transmission line 14B, a distance between the first radio frequency transmission line 14A and the extending-out region is greater than a distance between the second radio frequency transmission line 14B and the extending-out region, each of the bias lines 12 is connected to a choke branch, and each of choke branches connected to the bias lines 12 includes a first choke branch 21 and/or a second choke branch 22. In the embodiment shown in FIG. 25, illustration is provided by taking the bias line 12 connected to the first choke branch 21 as an example.

In a case that the first radio frequency transmission line 14A is connected to the first choke branch 21 and the second choke branch 22, a first resistance is a total equivalent resistance of the first choke branch 21 and the second choke branch 22 in the circuit. In a case that the second radio frequency transmission line 14B is connected to the first choke branch 21 and the second choke branch 22, a second resistance is a total equivalent resistance of the first choke branch 21 and the second choke branch 22 in the circuit.

In the embodiment shown in FIG. 25, the choke branch corresponding to the first radio frequency transmission line 14A has the first resistance, the choke branch corresponding to the second radio frequency transmission line 14B has the second resistance, and the second resistance is greater than the first resistance. In the embodiment, the length of the bias line 12 connected to the first radio frequency transmission line 14A is different from the length of the bias line 12 connected to second radio frequency transmission line 14B, and the bias line 12 with a larger length has a larger resistance. The second resistance is configured to be greater than the first resistance, and the difference between impedances of bias-signal transmission circuits caused by the difference of the lengths of the bias lines 12 may be reduced.

As described above, the choke effect of the choke branch is related to the length of the choke branch and is not related to the shape of the choke branch. Therefore, lengths of the choke branches connected to different bias lines 12 may be adjusted according to requirements. In other embodiments, the choke branches connected to the bias lines 12 may be configured to have a same length.

In an embodiment of the present disclosure, as shown in FIG. 25, the first wire 121 includes a first sub wire and a second sub wire. The first sub wire and the second sub wire are connected to each other and form an integrated structure. An extension direction of the first sub wire intersects with an extension direction of the second sub wire. The first sub wire is connected between the second sub wire and the radio frequency transmission line. The second sub wire and the second wire form the lapping region. The first sub wire is connected to a first choke branch. In a same bias line, the first choke branch is arranged on a side of the first sub wire away from the second wire. The first sub wire is a lateral extension of the first wire 121 shown in FIG. 25, and the second sub wire is a longitudinal extension of the first wire 121 shown in FIG. 25. In the embodiment, in a case that each of the first wires 121 is connected to a first choke branch 21, the first choke branches 21 are arranged on a side away from the second wires 122, facilitating the arrangement of the first choke branches 21.

In the embodiments of the present disclosure, the way for adjusting the bias-signal transmission circuits connected to different bias lines 12 to have a same resistance is not limited to the embodiments shown in FIG. 24 and FIG. 25. In an embodiment, in the bias line 12 connected to the first radio frequency transmission line 14A, a line width of the second wire 122 away from the lapping region 123 is determined as a first line width; in the bias line 12 connected to the second radio frequency transmission line 14B, a line width of the second wire 122 away from the lapping region 123 is determined as a second line width, and the second line width is configured to be less than the first line width. In this way, the bias lines 12 with different lengths may be configured to have a same resistance or approximately same resistances.

In an embodiment of the present disclosure, the first wire 121 and the radio frequency transmission line 14 may be configured to have a same thickness.

In order to reduce the risk that the second wire 122 is broken in extending upwards in the lapping region 123, the thickness of the first wire 121 may be configured to be less than the thickness of the radio frequency transmission line 14.

The first wire 121 and the radio frequency transmission line 14 may be formed by performing a deposition process. In addition, a longer deposition time period is required for the radio frequency transmission line 14, and the radio frequency transmission line 14 has a greater thickness.

In one embodiment, the first wire 121 and the radio frequency transmission line 14 may be obtained by performing an etching process based on a conductive layer with a uniform thickness. In etching the conductive layer, the first wire 121 is obtained after performing the etching process, and the radio frequency transmission line 14 has a larger thickness compared to the first wire 121.

Figure 26:
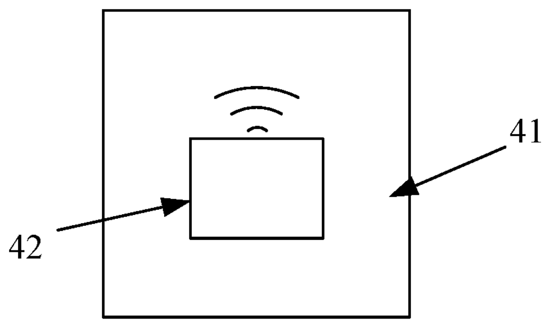
FIG. 26 is a schematic structural diagram of a wireless communication device according to an embodiment of the present disclosure.

Based on the above embodiments, a wireless communication device is provided according to another embodiment of the present disclosure. Referring to FIG. 26, FIG. 26 is a schematic structural diagram of a wireless communication device according to an embodiment of the present disclosure. The wireless communication device 41 shown in FIG. 26 includes the phase shifter 42 according to the above embodiments.

The wireless communication device may be a base station on the ground, a customer premise equipment (CPE) for a wireless broadband integrated communication system, a vehicle terminal, a ship terminal, and the like.

The wireless communication device may be an antenna device provided with a phase shifter, such as a satellite receiving antenna, a ship communication antenna, a vehicle radar antenna, a 5G base station antenna, a CPE antenna, and the like.

In the embodiments of the present disclosure, the wireless communication device adopts the phase shifter according to the above embodiments, achieving a good choke effect on radio frequency signals, avoiding leakage of the radio frequency signals and improving stability and reliability of transmission of the radio frequency signals.

The embodiments in the specification are described in a progressive, or juxtaposed, or a combination of progressive and juxtaposed manner. Each embodiment focuses on differences from other embodiments. For the same or similar parts among the embodiments, one may refer to description of other embodiments. Since the wireless communication device disclosed in the embodiments corresponds to the phase shifter disclosed in the embodiments, the description of the wireless communication device is simple, and for relevant matters, one may refer to the description of the phase shifter.

It should be noted that, in the description of the present disclosure, it should be understood that the drawings and the description of the embodiments are illustrative rather than restrictive. A same reference numeral throughout the embodiments of the specification is used to identify a same structure. In addition, the thicknesses of a layer, a film, a panel, a region may be enlarged in the drawings for ease of understanding and description. It may be understood that, when an element such as a layer, a film, a region or a substrate is referred to as being "on" another element, the element may be directly on another element or an intermediate element may exist between the element and the anther element. In addition, the term "on" indicates to position an element on or below another element, and does not essentially indicate to position an element on top of another element in a direction of gravity.

The orientation or positional relationship indicated by the terms "upper", "lower", "top", "bottom", "inner", and "outer" and the like is based on the orientation or positional relationship shown in the drawings, and is merely for the convenience of describing the present disclosure or simplifying the description, and does not indicate or imply that the device or element referred to must have a specific orientation or be constructed or operated in a specific orientation, and therefore cannot be understood as a limitation of the present disclosure. If a component is considered to be "connected" to another component, the component may be directly connected to another component or there may be a component arranged between the two components.

It should be further noted that a relation term such as "first" and "second" herein is only used to distinguish one entity or operation from another entity or operation, and does not necessarily require or imply that there is an actual relation or sequence between these entities or operations. Furthermore, terms such as "include", "comprise" or any other variations thereof are intended to be non-exclusive. Therefore, an article or device including a series of elements includes not only the elements but also other elements that are not enumerated, or further includes the elements inherent for the article or device. Unless expressively limited otherwise, the statement "comprising (including) one . . . " does not exclude the case that other similar elements may exist in the process, method, article or device.

What is claimed is:

1. A phase shifter, comprising:

a first substrate;

a radio frequency transmission line; and a bias line; wherein the radio frequency transmission line is arranged on a side of the first substrate; the bias line is connected to the radio frequency transmission line; the bias line comprises a first wire and a second wire; a sheet resistance of the second wire is configured to be greater than a sheet resistance of the radio frequency transmission line; the first wire and the radio frequency transmission line are connected to each other and form an integrated structure, and a line width of the first wire is configured to be less than a line width of the radio frequency transmission line; the second wire and the first wire are configured to form a lapping region along an extension direction of the first wire; in the lapping region, the second wire is arranged on a side of the first wire away from the first substrate; and in a direction perpendicular to a plane where the first substrate is located, the second wire is configured to cover the first wire.

2. The phase shifter according to claim 1, wherein the sheet resistance of the second wire is configured to be at least 1000 times the sheet resistance of the radio frequency transmission line.

3. The phase shifter according to claim 1, wherein the first wire and the radio frequency transmission line are arranged in a first conductive layer; the second wire is arranged in a second conductive layer; an insulating layer is arranged between the first conductive layer and the second conductive layer; and in the lapping region, the second wire is electrically connected to the first wire through multiple first conductive through holes.

4. The phase shifter according to claim 3, wherein in the lapping region, the second wire and the first wire are configured to at least partially overlap with each other in a first direction, the first direction is parallel to the plane where the first substrate is located, and the first direction intersects with the extension direction of the first wire.

5. The phase shifter according to claim 1, wherein a thickness of the first wire is configured to be greater than a thickness of the second wire in the direction perpendicular to the plane where the first substrate is located; and the line width of the first wire near the first substrate is greater than the line width of the first wire away from the first substrate.

6. The phase shifter according to claim 1, wherein a length of the first wire is configured to be not less than nλ/2 and not greater than nλ/2, n represents a positive integer, and λ represents a center wavelength of a radio frequency signal transmitted through the radio frequency transmission line.

7. The phase shifter according to claim 1, further comprising:

a first choke branch; and/or a second choke branch; wherein the first choke branch and the first wire are connected to each other and form an integrated structure, and a length of the first choke branch is configured to be $n_1\lambda/4$; the second choke branch and the second wire are connected to each other and form an integrated structure, and a length of the second choke branch is configured to be $n_2\lambda/4$; and $n_1$ and $n_2$ represent positive integers, and λ represents a center wavelength of a radio frequency signal transmitted through the radio frequency transmission line.

8. The phase shifter according to claim 1, wherein the bias line comprises a first choke branch and a second choke branch;

a length of the first choke branch is configured to be $m_1\lambda/4$, and a length of the second choke branch is configured to be $m_2\lambda/4$, $m_1$ and $m_2$ represent positive integers, and λ represents a center wavelength of a radio frequency signal transmitted through the radio frequency transmission line; and in the direction perpendicular to the plane where the first substrate is located, the second choke branch is arranged on a side of the first choke branch away from the first substrate, the second choke branch and the first choke branch are configured to at least partially overlap with each other, and the second choke branch covers the first choke branch in an overlapping region.

9. The phase shifter according to claim 8, wherein a line width of the first choke branch is configured to be equal to the line width of the first wire, a line width of the second choke branch is configured to be equal to the line width of the second wire, and the second choke branch covers the first choke branch in the direction perpendicular to the plane where the first substrate is located.

10. The phase shifter according to claim 8, wherein the first choke branch, the first wire and the radio frequency transmission line are arranged in a first conductive layer; the second choke branch and the second wire are arranged in a second conductive layer; an insulating layer is arranged between the first conductive layer and the second conductive layer; in the lapping region, the second wire is connected to the first wire through a first conductive through hole; and in the overlapping region of the second choke branch and the first choke branch, the second choke branch is connected to the first choke branch through second conductive through holes.

11. The phase shifter according to claim 1, wherein the first wire comprises a plurality of first wire segments arranged in sequence along the extension direction of the first wire; a respective first gap is arranged between adjacent first wire segments; the radio frequency transmission line and first wire segments are connected to each other and form the integrated structure; and adjacent first wire segments are connected to each other through the second wire.

12. The phase shifter according to claim 11, wherein in the lapping region, the second wire comprises a plurality of second wire segments arranged in sequence; a respective second gap is arranged between adjacent second wire segments; and two adjacent first wire segments are connected to each other through one of the plurality of second wire segments.

13. The phase shifter according to claim 12, wherein a length of the first wire segment is configured to be not less than $n_3\lambda/4$ and not greater than $n_3\lambda/2$, $n_3$ represents a positive integer, and λ represents a center wavelength of a radio frequency signal transmitted through the radio frequency transmission line.

14. The phase shifter according to claim 12, wherein in a case that the number of the plurality of second wire segments arranged in sequence is m;

in an extension direction of the bias line away from the radio frequency transmission line, the m second wire segments, from a first second wire segment to an m-th second wire segment, are arranged in sequence, and m represents a positive integer greater than 1; and a length of each of the first second wire segment to an (m−1)th second wire segment is configured to be not less than $n_4\lambda/4$ and not greater than $n_4\lambda/2$, $n_4$ represents a positive integer, and λ represents a center wavelength of a radio frequency signal transmitted through the radio frequency transmission line; and an end of the m-th second wire segment is connected to a first wire segment farthest from the radio frequency transmission line, and another end of the m-th second wire segment extends to a connection region.

15. The phase shifter according to claim 1, further comprising:

a second substrate;

a liquid crystal layer; and a reference electrode; wherein the second substrate is arranged opposite to the first substrate, and the second substrate is arranged on a side of the radio frequency transmission line away from the first substrate;

the liquid crystal layer is arranged between the second substrate and the first substrate; and the reference electrode arranged on a side of the second substrate close to the first substrate.

16. The phase shifter according to claim 1, wherein the first wire comprises a first sub wire and a second sub wire; the first sub wire and the second sub wire are connected to each other and form an integrated structure; an extension direction of the first sub wire intersects with an extension direction of the second sub wire; the first sub wire is connected between the second sub wire and the radio frequency transmission line; the second sub wire and the second wire form the lapping region; the first sub wire is connected to a first choke branch; and in the same bias line, the first choke branch is arranged on a side of the first sub wire away from the second wire.

17. The phase shifter according to claim 1, wherein in a case that a plurality of bias lines and a plurality of radio frequency transmission lines are arranged, the first substrate is arranged with a plurality of device regions that are arranged in an array; each of the device regions is arranged with one of the plurality of radio frequency transmission lines; each of the radio frequency transmission lines is connected to one of the plurality of bias lines; the plurality of bias liens extend out from a same side of the first substrate; and bias-signal transmission circuits where the plurality of bias lines are arranged are configured to have a same impedance.

18. The phase shifter according to claim 17, wherein for each of the radio frequency transmission lines, the radio frequency transmission line comprises a first radio frequency transmission line and a second radio frequency transmission line, a distance between the first radio frequency transmission line and a extending-out region is configured to be greater than a distance between the second radio frequency transmission line and the extending-out region, and the bias line among the plurality of bias lines that is connected to the second radio frequency transmission line comprises a polyline with a plurality of bends in a same layer.

19. The phase shifter according to claim 17, wherein for each of the radio frequency transmission lines, the radio frequency transmission line comprises a first radio frequency transmission line and a second radio frequency transmission line, and a distance between the first radio frequency transmission line and an extending-out region is greater than a distance between the second radio frequency transmission line and the extending-out region;

each of the bias lines is connected to a choke branch; and a choke branch corresponding to the first radio frequency transmission line is configured to have a first resistance, a choke branch corresponding to the second radio frequency transmission line is configured to have a second resistance, and the second resistance is configured to be greater than the first resistance.

20. A wireless communication device, comprising a phase shifter, wherein the phase shifter comprises: a first substrate, a radio frequency transmission line, and a bias line; and the radio frequency transmission line is arranged on a side of the first substrate; the bias line is connected to the radio frequency transmission line; the bias line comprises a first wire and a second wire; a sheet resistance of the second wire is configured to be greater than a sheet resistance of the radio frequency transmission line; the first wire and the radio frequency transmission line are connected to each other and form an integrated structure, and a line width of the first wire is configured to be less than a line width of the radio frequency transmission line; the second wire and the first wire are configured to form a lapping region along an extension direction of the first wire; in the lapping region, the second wire is arranged on a side of the first wire away from the first substrate; and in a direction perpendicular to a plane where the first substrate is located, the second wire is configured to cover the first wire.

* * * * *